United States Patent [19]
Hsi-Chang

[11] Patent Number: 6,009,693
[45] Date of Patent: Jan. 4, 2000

[54] BREATHABLE, WATERPROOF HORSE BLANKET

[75] Inventor: Chang Hsi-Chang, Taichung, Taiwan

[73] Assignee: Eastwest International Enterprises, Taichung, Taiwan

[21] Appl. No.: 09/145,814

[22] Filed: Sep. 2, 1998

[51] Int. Cl.[7] ..................................................... B68C 5/00
[52] U.S. Cl. ............................................................ 54/79.1
[58] Field of Search .................................... 54/79.1, 79.2, 54/79.4; 119/850

[56] References Cited

U.S. PATENT DOCUMENTS

| | | | |
|---|---|---|---|
| 2,400,781 | 5/1946 | Priour | 54/79.1 |
| 5,271,211 | 12/1993 | Newman | 54/79.4 X |

FOREIGN PATENT DOCUMENTS

| | | | |
|---|---|---|---|
| 689647 | 10/1979 | U.S.S.R. | 54/79.4 |

Primary Examiner—Robert P. Swiatek
Attorney, Agent, or Firm—Antonio R. Durando

[57] ABSTRACT

An impermeable horse blanket includes mesh material for ventilation of the horse's back while it is covered by the blanket. The mesh material is shielded by a waterproof top cover that protects it and prevents water from wetting the horse while allowing breathing through the openings of the mesh. The front edge of the top cover is attached to the blanket by means of a continuous seam along a front hem that encases a length of plastic piping sufficiently thick to provide a relief structure for raising the front edge of the cover slightly with respect to the blanket and the mesh material. The top cover is also stitched to the blanket at discrete points around its sides and back edge, such that relatively long segments of the side and back perimeter are not attached to the blanket. Thus, an air stream produced by wind or the horse's motion is able to flow between the top cover and the mesh material, thereby producing desirable ventilation while still protecting the back of the horse from rain. The netting material also ensures that insects and debris cannot infiltrate the blanket.

14 Claims, 3 Drawing Sheets

BREATHABLE, WATERPROOF HORSE BLANKET

BACKGROUND OF THE INVENTION

1. Field of the Invention

This invention pertains to the field of protective covers for horses, such as blankets and turnout rugs. In particular, it relates to a protective blanket that is both waterproof and breathable to improve the comfort of a horse.

2. Description of the Related Art

Horse blankets and water-resistant rain covers have been in use for a long time. They protect horses from cold weather and rain in corrals and stables, often after riding, when the horses are overheated by exertion. Therefore, it is important that the horses be kept dry and free of accumulation of moisture and sweat under the blanket.

The best modern water-resistant fabrics are typically made with laminated materials that permit passage of moisture from the inside out but prevent flow in the opposite direction. These materials are said to allow breathing and are therefore considered "breathable," as that term has become known in the industry. Often a permeable inside layer is added to the water-resistant fabric for comfort.

Although very useful and popular for sportswear and other applications, such fabrics are relatively expensive to manufacture, especially for equestrian use. Therefore, a less costly approach would be welcome in the industry. This invention is directed at a simple solution to provide such an improvement.

BRIEF SUMMARY OF THE INVENTION

The primary goal of this invention is to provide breathing to a water-resistant blanket for a horse, such that the animal will stay relatively dry even under wet and warm conditions.

Another goal is to provide or increase such breathing by means of natural ventilation.

Finally, an objective of the invention is a rain cover or blanket that can be manufactured relatively inexpensively with standard waterproof and mesh materials appropriately combined to permit ventilation under the blanket.

Therefore, according to these and other objectives, the present invention consists of an impermeable horse blanket with a midsection that includes mesh material for ventilation of the horse's back while it is covered by the blanket. The mesh material is shielded by a waterproof top cover that protects it and prevents water from wetting the horse while allowing breathing through the openings of the mesh. The front edge of the top cover is attached to the blanket by means of a continuous seam along a front hem that encases a length of plastic piping sufficiently thick to provide a relief structure for raising the front edge of the cover slightly with respect to the blanket and the mesh material. The top cover is also stitched to the blanket at discrete points around its sides and back edge, such that relatively long segments of the side and back perimeter are not attached to the blanket. Thus, an air stream produced by wind or the horse's motion is able to flow between the top cover and the mesh material, thereby producing desirable ventilation while still protecting the back of the horse from rain. The netting material also ensures that insects and debris cannot infiltrate the blanket. At the same time, sweat and other moisture created under the blanket can escape through the covered mesh material and the horse is kept dry and comfortable.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED EMBODIMENTS OF THE INVENTION

The idea of this invention is the inclusion of mesh material shielded by a loosely-attached top cover in the traditional design of a water repellant horse blanket in order to provide ventilation and breathing to the back of the horse, especially under sweaty conditions. The terms impermeable, water resistant, water repellant and waterproof are used interchangeably herein to indicate the ability of the material used for the invention to prevent water absorption and penetration.

Figure 1:
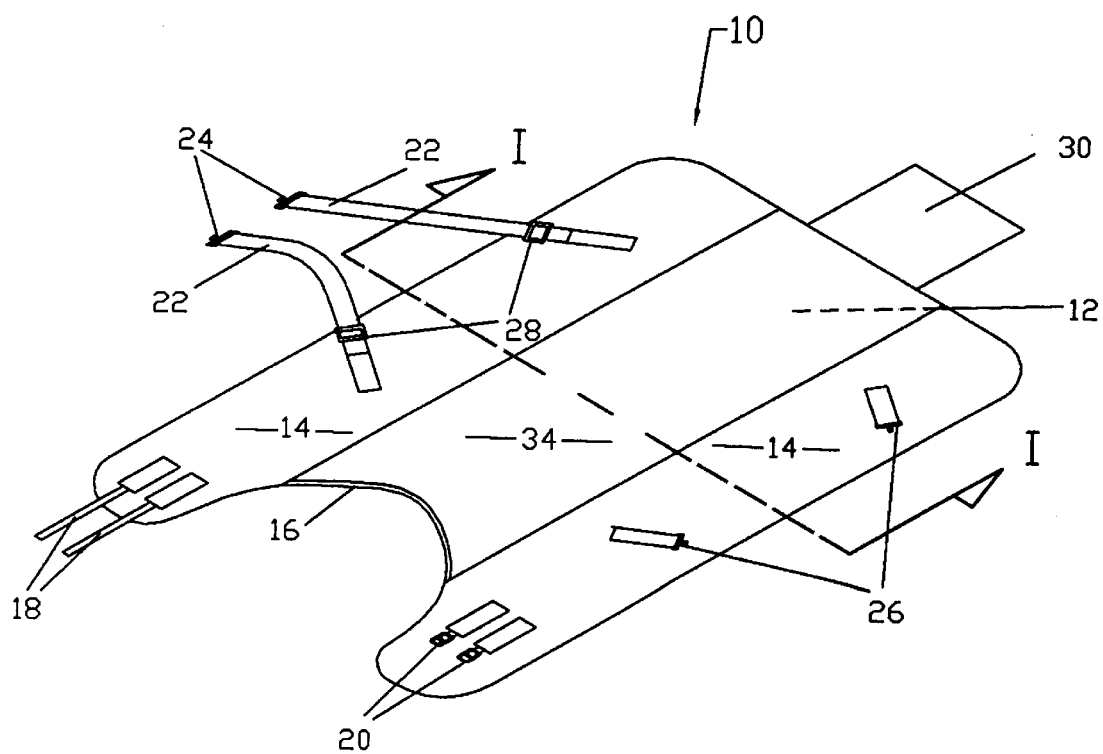
FIG. 1 is a perspective view of a horse blanket according to the invention, shown as it would be seen laid on a flat surface with its top side up.

Referring to the drawings, wherein like reference numerals correspond to like parts throughout, FIG. 1 is a perspective view of a waterproof horse blanket 10 according to the invention, seen as it would appear laid on a flat support surface. The blanket 10 includes a lower layer for direct contact with the back of a horse. This layer consists of a midsection 12 between two sides 14 that define a neck cutout 16 tailored to fit around the neck of the horse wearing the blanket. Neck straps 18 with corresponding buckles 20 are provided to secure the front end of the blanket 10 around the neck of the horse. Body straps 22 are similarly provided to fasten the blanket around the belly of the horse by means of mating snaps 24,26 and tensioning means 28. A tail cover 30 is adapted to extend over the tail of the horse wearing the blanket and protect it from rain. These design criteria are not described in further details here because they are well known in the art.

According to the invention, the main body of the blanket 10, the lower layer in contact with the hair of the horse, consists of a single-piece layer of impermeable material comprising the sides 14, the tail cover 30, and a portion of the midsection 12. An area of mesh material 32 is contained within the midsection 12 between the two sides 14, as illustrated in the cross-sectional view of FIG. 2. This net area is preferably sufficiently large to cover the entire back of a horse wearing the blanket and the density of the mesh is selected with an appropriate number of openings for promoting breathing between the animal's skin and hair and the surrounding environment. I found that nylon mesh material with about 81 openings per square inch (that is, a 9×9 grid of holes), each opening about $1/16$ of an inch in diameter, produces very efficient breathing. Obviously, the mesh needs to be sufficiently small to prevent intrusion by insects and foreign objects and large enough to allow breathing. The partially exploded view of FIG. 3 shows the mesh material 32 contained within the sheet of waterproof material that constitutes the main body of the blanket 10.

The mesh material 32 is shielded from rain by a waterproof top cover 34 sufficiently large to overlap the entire net area and prevent water penetration from above. The front edge 36 of the cover 34 is attached to the neck cutout 16 of the bottom layer, preferably through a stitched seam. A segment of piping 38 is hemmed into the stitched edge 36 to slightly raise the front end of the cover 34 with respect to the lower layer of the blanket and the mesh material, such that air can penetrate under the cover and ventilate the net area. I found that standard plastic piping about 1/8 to 1/2 of an inch in diameter, as commonly used to shape or stiffen backpacks and pillows, is sufficiently thick to provide the raised edge necessary for the intended purpose. The sides 40,42 and the back edge 44 of the top cover 34 are also attached, such as by stitches 48, to the bottom layer of the blanket at discrete points along the perimeter of the cover. Thus, the mesh material 32 is loosely covered by the waterproof top cover 34 attached to the blanket 10. All stitches sewn through the blanket are preferably sealed by waterproof tape on the back to ensure impermeability at the point of connection.

Figure 2:
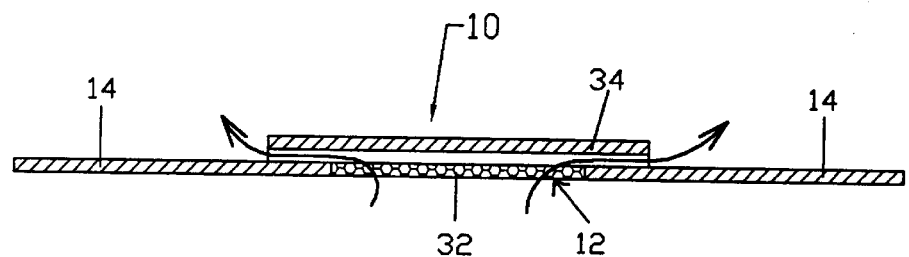
FIG. 2 is a cross-sectional view of the blanket of FIG. 1 taken along line I—I in that figure.
Figure 3:
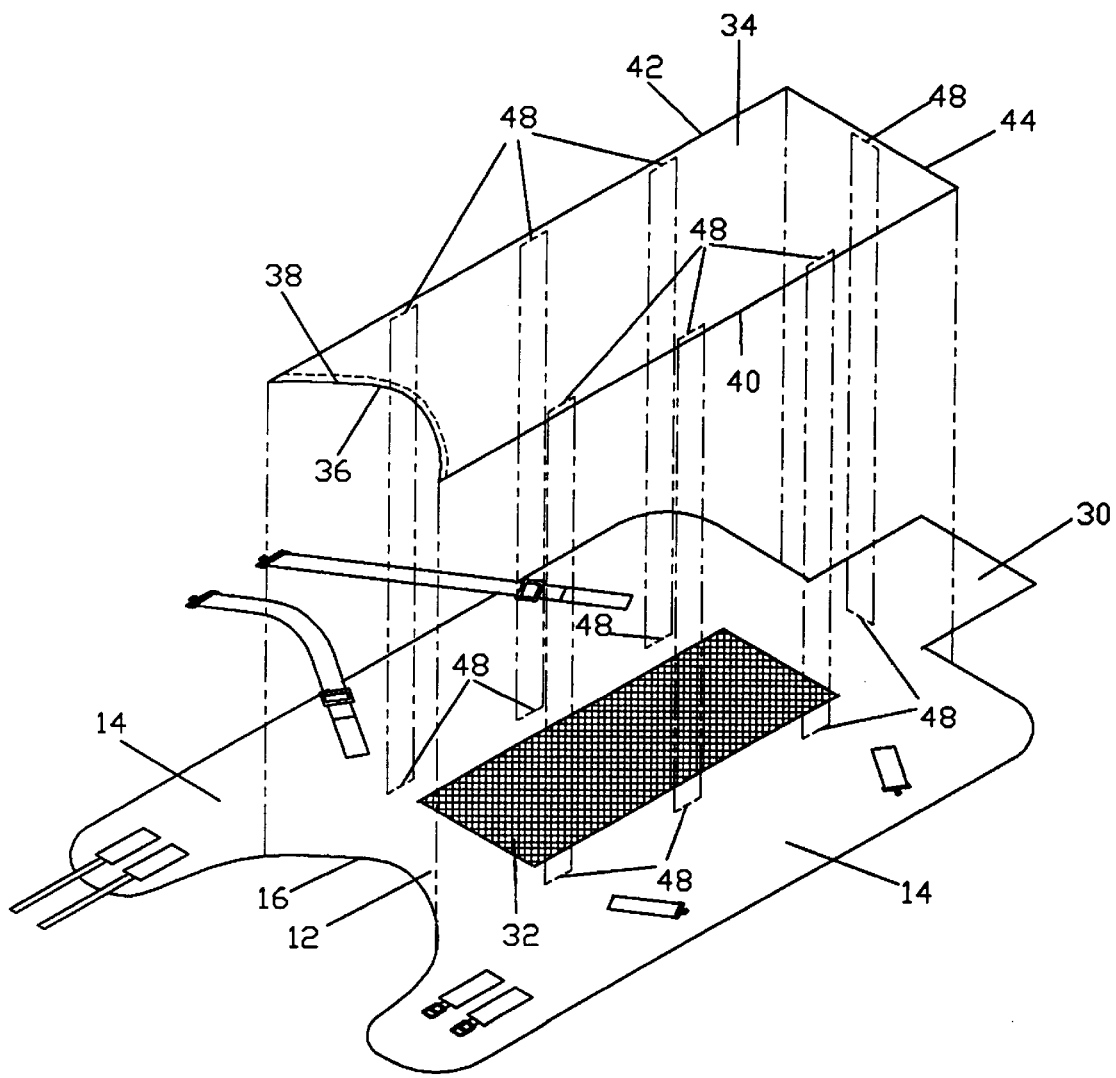
FIG. 3 is a partially exploded view of the blanket of FIG. 1 showing the mesh material of the invention and the points of attachment of the top cover to the blanket.
Figure 4:
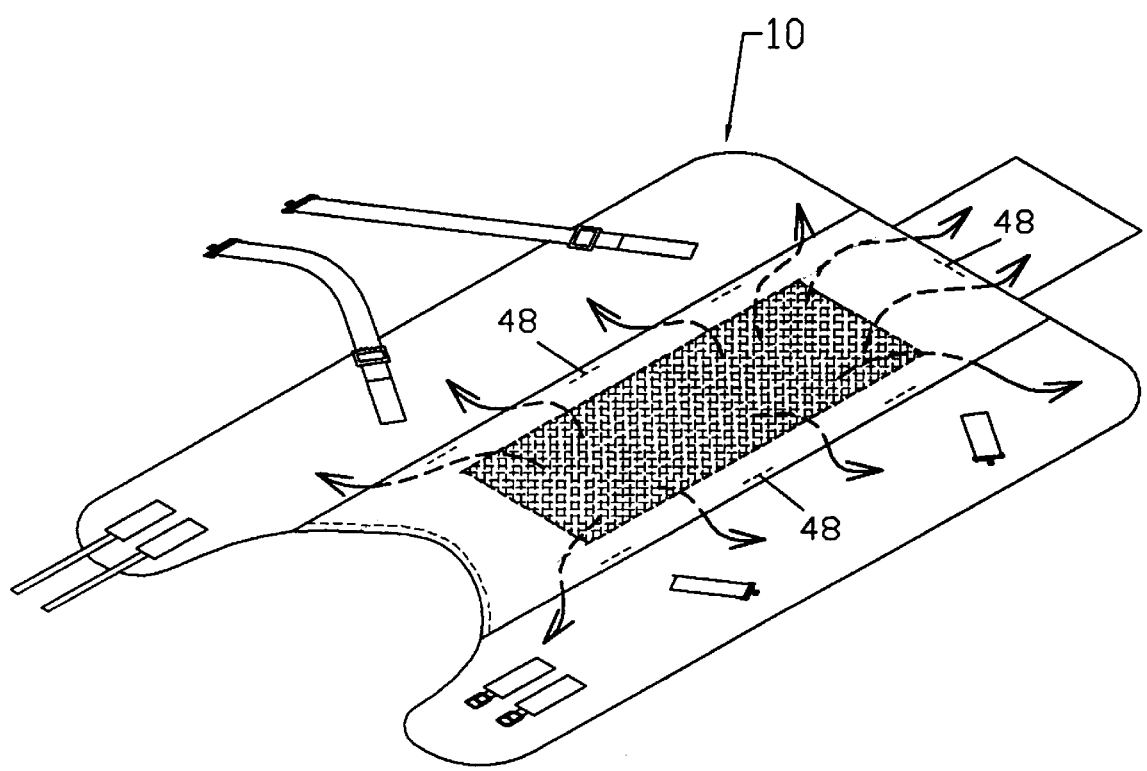
FIG. 4 is a view of the blanket of FIG. 1 illustrating the outgoing pattern of flow of perspiration generated by a horse wearing the blanket.

As a result to the method of attachment described above, the top cover 34 is secured above the mesh material 32, as illustrated in the sectional view of FIG. 2, such that the cover loosely overlaps the net area to prevent rain or outside moisture from penetrating through the holes. Because the side and back edges of the cover 34 are not attached to the bottom layer of the blanket 10, air can freely flow through the openings of the mesh material 32 and provide ventilation to the back of the horse's body covered by the blanket. The horse's movements and wind can further enhance ventilation through the netted area. Because of the thickness of the piping 38 and the corresponding lift provided by the front edge 36 of the top cover over the blanket's lower layer, the cover 32 is also slightly separated from the rest of the blanket 10, so that air flow is at least partially present even when the horse is standing still and no wind is present. At the same time, the netting material 32 protects the horse because insects, debris and other undesirable particles are prevented from working their way under the blanket 10. The ventilation resulting from the invention, which is illustrated by the arrows in FIGS. 1 and 4, has proven to provide significant comfort to a horse, especially under wet conditions.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A ventilated horse blanket comprising:

a blanket layer comprising two sides and a midsection;

an area of mesh material contained within said midsection; and a top cover for shielding said area of mesh material;

wherein said top cover is partially attached to the blanket layer and partially loose to allow air flow through the mesh material.

2. The blanket of claim 1, further comprising a segment of piping affixed along the perimeter of said cover to provide a raised edge with respect to the blanket layer.

3. The blanket of claim 2, wherein said segment of piping is affixed along a front edge of the cover.

4. The blanket of claim 3, further comprising multiple discrete points of attachment between the cover and the blanket layer.

5. The blanket of claim 4, wherein said mesh material consists of a net with about 81 openings per square inch.

6. The blanket of claim 2, wherein said mesh material consists of a net with about 81 openings per square inch.

7. The blanket of claim 1, wherein said mesh material consists of a net with about 81 openings per square inch.

8. The blanket of claim 1, wherein said blanket layer and said top cover are made of waterproof material.

9. The blanket of claim 8, further comprising a segment of piping affixed along the perimeter of said cover to provide a raised edge with respect to the blanket layer.

10. The blanket of claim 9, wherein said segment of piping is affixed along a front edge of the cover.

11. The blanket of claim 10, further comprising multiple discrete points of attachment between the cover and the blanket layer.

12. The blanket of claim 11, wherein said mesh material consists of a net with about 81 openings per square inch.

13. The blanket of claim 9, wherein said mesh material consists of a net with about 81 openings per square inch.

14. The blanket of claim 8, wherein said mesh material consists of a net with about 81 openings per square inch.

* * * * *